US009003115B2

(12) United States Patent
Balasubramanian

(10) Patent No.: US 9,003,115 B2
(45) Date of Patent: *Apr. 7, 2015

(54) METHOD AND SYSTEM FOR GOVERNING AN ENTERPRISE LEVEL GREEN STORAGE SYSTEM DRIVE TECHNIQUE

(71) Applicant: NetApp, Inc., Sunnyvale, CA (US)

(72) Inventor: Sridhar Balasubramanian, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,002

(22) Filed: Mar. 25, 2014

(65) Prior Publication Data

US 2014/0201555 A1    Jul. 17, 2014

Related U.S. Application Data

(63) Continuation of application No. 14/047,520, filed on Oct. 7, 2013, now Pat. No. 8,725,945, which is a continuation of application No. 12/407,795, filed on Mar. 20, 2009, now Pat. No. 8,631,200.

(51) Int. Cl.
*G06F 3/06* (2006.01)
*G06F 12/00* (2006.01)
*G11B 19/20* (2006.01)

(52) U.S. Cl.
CPC ............ *G06F 3/0665* (2013.01); *G06F 3/0625* (2013.01); *G06F 3/0634* (2013.01); *G06F 3/0647* (2013.01); *G06F 3/0689* (2013.01); *G11B 19/209* (2013.01); *Y02B 60/1246* (2013.01)

(58) Field of Classification Search
None
See application file for complete search history.

(56) References Cited

U.S. PATENT DOCUMENTS

| | | |
|---|---|---|
| 6,122,232 A | 9/2000 | Schell et al. |
| 2003/0165088 A1 | 9/2003 | Turner et al. |
| 2005/0235337 A1 | 10/2005 | Wilson et al. |
| 2007/0061509 A1 | 3/2007 | Ahluwalla et al. |
| 2008/0201593 A1 | 8/2008 | Hori et al. |
| 2009/0064161 A1 | 3/2009 | Hosouchi et al. |
| 2009/0177837 A1 | 7/2009 | Kaneda |
| 2010/0121892 A1 | 5/2010 | Matsumoto et al. |

(Continued)

OTHER PUBLICATIONS

Office Action dated Jul. 26, 2011 in parent application, U.S. Appl. No. 12/407,795, 18 pages.

(Continued)

*Primary Examiner* — Daniel Bernard
(74) *Attorney, Agent, or Firm* — Haynes and Boone, LLP

(57) ABSTRACT

A method and system for manipulating a spin state of each disk in a drive array is disclosed. In one embodiment, a method includes monitoring input/output (I/O) requests to each disk drive in a disk array and identifying any disk drive as an inactive disk drive based on a number of I/O requests directed to said any disk drive for a given time interval. The method further includes moving data from the inactive disk drive to an active disk drive having a free disk space to store the data and updating metadata associated with the data using a log-structured file system for the disk array. Further, the method includes manipulating a spin state of the inactive disk drive by spinning down the inactive disk drive to conserve power. Furthermore, the method includes redirecting subsequent I/O requests for the inactive disk drive to the active disk drive by accessing the metadata of the log-structured file system.

20 Claims, 4 Drawing Sheets

(56) References Cited

U.S. PATENT DOCUMENTS

2010/0205370 A1    8/2010    Ikawa et al.
2010/0238574 A1    9/2010    Balasubramanian
2010/0306186 A1    12/2010    Tobita

OTHER PUBLICATIONS

Final Office Action dated Nov. 10, 2011 in parent application, U.S. Appl. No. 12/407,795, 22 pages.

Office Action dated Jan. 2, 2013 in parent application, U.S. Appl. No. 12/407,795, 25 pages.

Final Office Action dated Jun. 5, 2013 in parent application, U.S. Appl. No. 12/407,795, 19 pages.

Notice of Allowance dated Sep. 12, 2013 in parent application, U.S. Appl. No. 12/407,795, 12 pages.

Jansen et al. "Guidelines on PDA Forensics." Recommendations of the National Institute of Standards and Technology, U.S. Department of Commerce. NIST Special Publication 800-72. Nov. 2004.

METHOD AND SYSTEM FOR GOVERNING AN ENTERPRISE LEVEL GREEN STORAGE SYSTEM DRIVE TECHNIQUE

REFERENCE TO RELATED APPLICATIONS

This application is a continuation of U.S. patent application Ser. No. 14/047,520, filed on Oct. 7, 2013 and issued as U.S. Pat. No. 8,725,945 on May 13, 2014, which is a continuation of U.S. Pat. No. 8,631,200, issued on Jan. 14, 2014, both of which are hereby incorporated by reference in their entirety.

FIELD OF TECHNOLOGY

Embodiments of the present invention relate to the field of electronics. More particularly, embodiments of the present invention relate to redundant array of independent disks (RAID) systems.

BACKGROUND

A redundant array of independent disks (RAID) system refers to a technology that allows computer users to achieve mainframe-class storage reliability from low-cost and less reliable personal computer (PC) class disk-drive components via the technique of arranging disk drives into a disk array or disk arrays for redundancy. The RAID system may comprise an array of disks servicing input/output (I/O) requests from multiple host devices (e.g., servers, client devices, etc.) via a network. Initially, a volume is created in the disk array for each host device, and data is accessed by the host device to and/or from the volume.

As the RAID system divides, replicates, and/or distributes data across multiple disks for increased reliability and I/O performance, all the disk drives in the disk array may need to remain in an active mode regardless of their actual usage. Since each active disk drive may spin at around 10,000 to 15,000 revolutions per minute during its active mode, the total power drawn to maintain all the disk drives for the RAID system in the active mode may be substantial.

SUMMARY

A method and system for identifying inactive disk drives and manipulating a spin state of the inactive disk drives is disclosed. In one aspect, a method includes monitoring input/output (I/O) requests to each disk drive in a disk array and identifying any disk drive as an inactive disk drive based on a number of I/O requests directed to said any disk drive for a given time interval. The method further includes moving data from the inactive disk drive to an active disk drive having a free disk space to store the data and updating metadata associated with the data using a log-structured file system for the disk array. Further, the method includes manipulating a spin state of the inactive disk drive by spinning down the inactive disk drive to conserve power. The method also includes redirecting subsequent I/O requests for the inactive disk drive to the active disk drive by accessing the metadata of the log-structured file system.

Furthermore, the method includes manipulating the spin state of the inactive disk drive by spinning up the inactive disk drive if a number of the subsequent I/O requests becomes greater than a first threshold value. Moreover, the method includes moving the redirected data from the active disk drive to the inactive disk drive and changing a state of the inactive disk drive from inactive to active. Additionally, the method includes updating the metadata of the log-structured file system based on the restoration of the redirected data to the inactive drive and freeing up the disk space on the active drive.

In another aspect, a disk controller for manipulating a spin state of each disk drive in a subsystem of a disk array includes a processor, a first memory for storing a log-structured file system for processing volume mapping information associated with a disk array, and a second memory having a set of instructions, that when executed by the processor, cause the processor to perform a method including monitoring I/O requests to each disk drive in a subsystem of the disk array.

The method further includes identifying any disk drive in the subsystem as an inactive disk drive based on a number of I/O requests directed to said any disk drive for a given time interval and moving data from the inactive disk drive to an active disk drive having a free disk space to store the data. The method also includes updating metadata associated with the data based on the log-structured file system and manipulating a spin state of the inactive disk drive by spinning down the inactive disk drive to conserve power.

Other features of the present embodiments will be apparent from the accompanying drawings and from the detailed description that follows.

BRIEF DESCRIPTION OF THE DRAWINGS

Various preferred embodiments are described herein with reference to the drawings, wherein.

The drawings described herein are for illustration purposes only and are not intended to limit the scope of the present disclosure in any way.

DETAILED DESCRIPTION

A method and system for identifying inactive disk drives and manipulating a spin state of the inactive disk drives is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
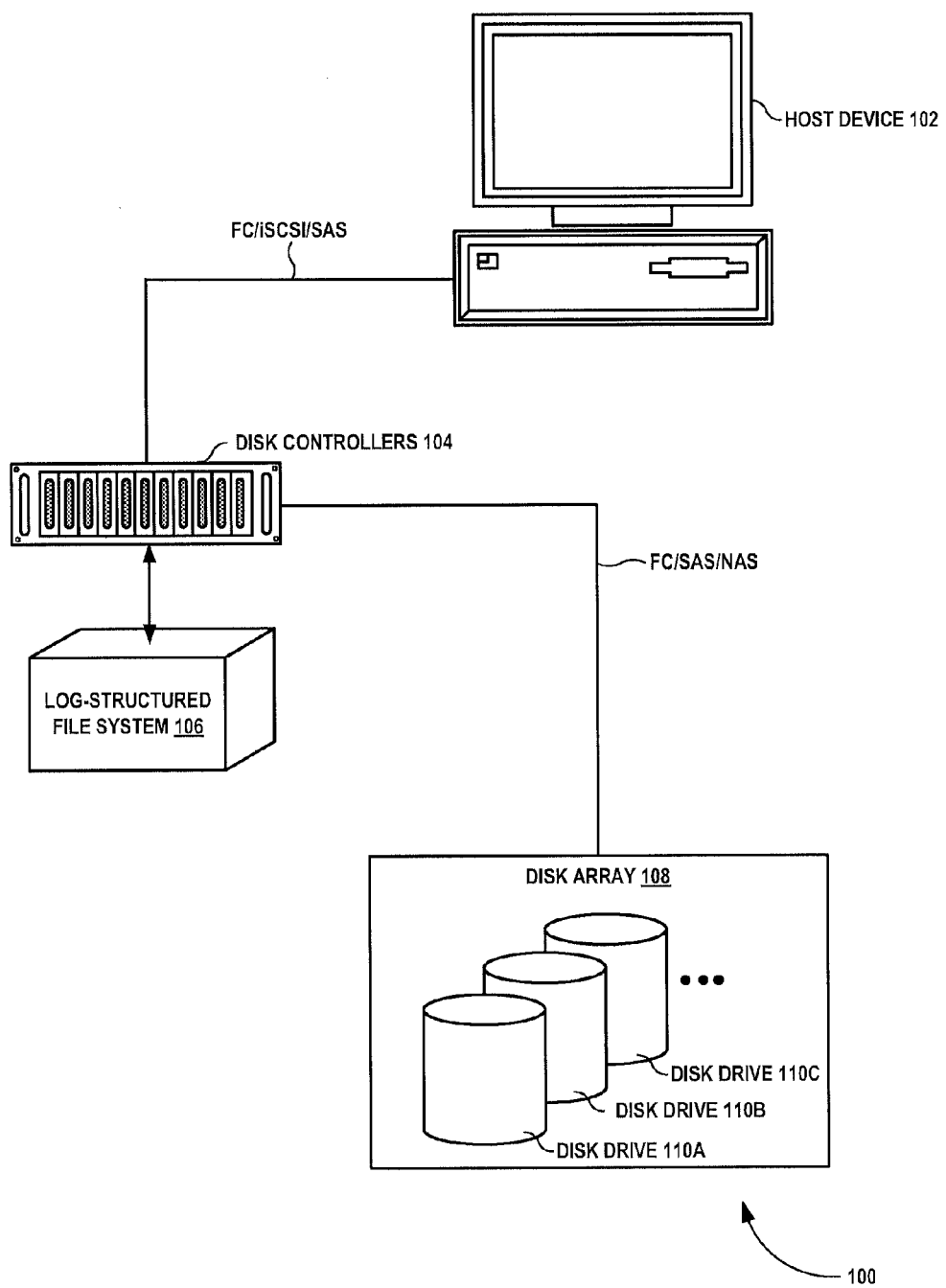
FIG. 1 illustrates a system diagram of an exemplary disk array with disk controllers equipped with a log-structured file system, according to one embodiment.

FIG. 1 illustrates a system diagram 100 of an exemplary disk array 108 with disk controllers 104 equipped with a log-structured file system 106, according to one embodiment. As shown in FIG. 1, the disk controllers 104 are coupled to a host device 102 for receiving input/output (I/O) requests. For example, the host device 102 may be an application server, a database and the like. It can be seen in FIG. 1 that, the host device 102 communicates to the disk controllers 104 through a channel such as, a fiber channel (FC), an internet small computer system interface (iSCSI), a serial attached SCSI (SAS), and the like.

The disk controllers 104 manage a plurality of disk drives 110A through C in the disk array 108. In one embodiment, the disk controllers 104 directs the I/O requests to a plurality of disk drives 110A through C in the disk array 108 through a channel (e.g., FC, SAS and NAS). As shown in FIG. 1, each of the disk controllers 104 is equipped with the log-structured file system 106. The log-structured file system 106 includes metadata associated with the plurality of disk drives 110A through C. In one embodiment, the disk controllers 104 manipulate a spin state of each of the disk drives 110A through C of the disk array 108, using the log-structured file system 106, to conserve power.

Figure 2:
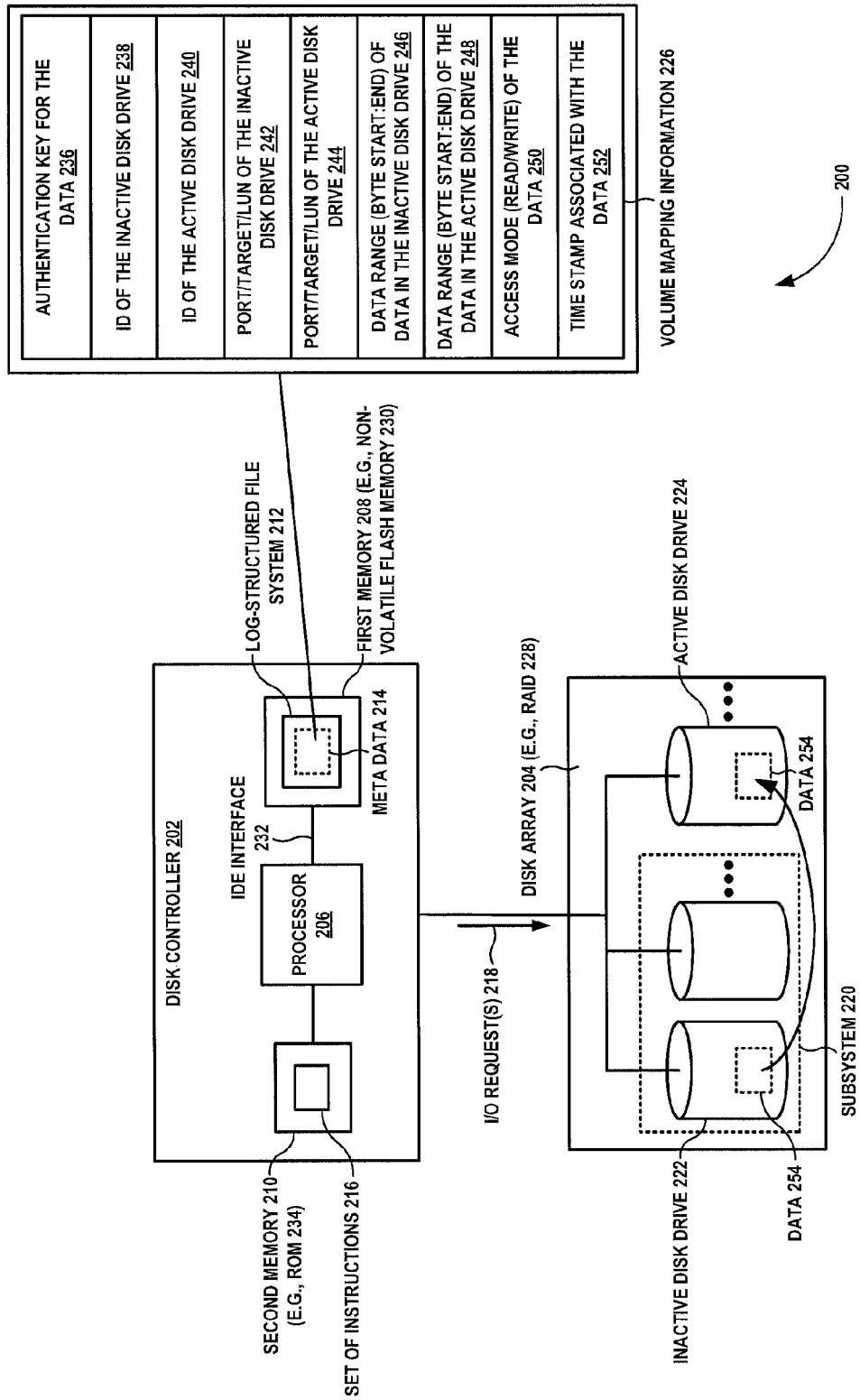
FIG. 2 is a block diagram of an exemplary disk controller which is operable for manipulating a spin state of each disk drive coupled to the disk controller, according to one embodiment.

FIG. 2 illustrates a block diagram 200 of an exemplary disk controller 202 which is operable for manipulating a spin state of each disk drive coupled to the disk controller 202, according to one embodiment. As shown in FIG. 2, the disk controller 202 is coupled to a disk array 204 (e.g., a redundant array of independent disks (RAID) 228) including a subsystem 220 of disk drives. As shown in FIG. 2, the disk controller 202 includes a processor 206, a first memory 208 (e.g., a nonvolatile flash memory 230) and a second memory 210 (e.g., read only memory (ROM) 234). The first memory 208 is coupled to the processor 206 using an integrated drive electronics (IDE) interface 232.

In one embodiment, the first memory 208 is operable for storing a log-structured file system 212 for processing volume mapping information 226 associated with the disk array 204. In another embodiment, the second memory 210 includes a set of instructions 216 for manipulating the spin state of each disk drive in the disk array 204. The set of instructions 216 are executed by the processor 206 for performing a method for manipulating the spin state of each disk drive in the disk array 204 in the manner described below.

In one embodiment, I/O requests 218 to each disk drive in a subsystem 220 of the disk array 204 are monitored. It can be seen in FIG. 2 that, each disk drive of the subsystem 220 is controlled by the disk controller 202. Further, any disk drive in the subsystem 220 is identified as an inactive disk drive (e.g., the inactive disk drive 222) if a number of I/O requests directed to said any disk drive for a given time interval is zero. If an inactive disk drive 222 is identified, then data 254 from the inactive disk drive 222 is moved to an active disk drive 224 having a free disk space to store the data 254.

Furthermore, metadata 214 associated with the data 254 is updated based on the log-structured file system 212. For example, the metadata 214 includes volume mapping information associated with the data 254. As shown in FIG. 2, the volume mapping information 226 includes an authentication key for data 236, an identifier (ID) of the inactive disk drive 238, an ID of the active disk drive 240, a data range of the data in the inactive disk drive 246, a data range of the data in the active disk drive 248, an access mode of the data 250, and a time stamp associated with the data 252. Further, the ID of the inactive disk drive 238 and the ID of the active disk drive 240 are based on a port/target/logical unit number (LUN) of the inactive disk drive 242 and a port/target/LUN of the active disk drive 244, respectively.

In accordance with the above mentioned embodiments, the spin state of the inactive disk drive 222 is manipulated by spinning down the inactive disk drive 222 to conserve power.

In one embodiment, subsequent I/O requests directed to the inactive disk drive 222 are redirected to the active disk drive 224 by accessing the metadata 214 of the log-structured file system 212. In one exemplary implementation, the subsequent I/O requests include subsequent data which is tagged as redirected data.

In another embodiment, the spin state of the inactive disk drive 222 is manipulated by spinning up the inactive disk drive 222 if a number of the subsequent I/O requests directed to the inactive disk drive 222 becomes greater than a first threshold value. In this embodiment, a copy back of the redirected data from the active disk drive 224 to the inactive disk drive 222 is performed. Then, the metadata 214 of the log-structured file system 212 is updated based on the copy back of the redirected data. Also, a state of the inactive disk drive 222 is changed from inactive to active.

Figure 3:
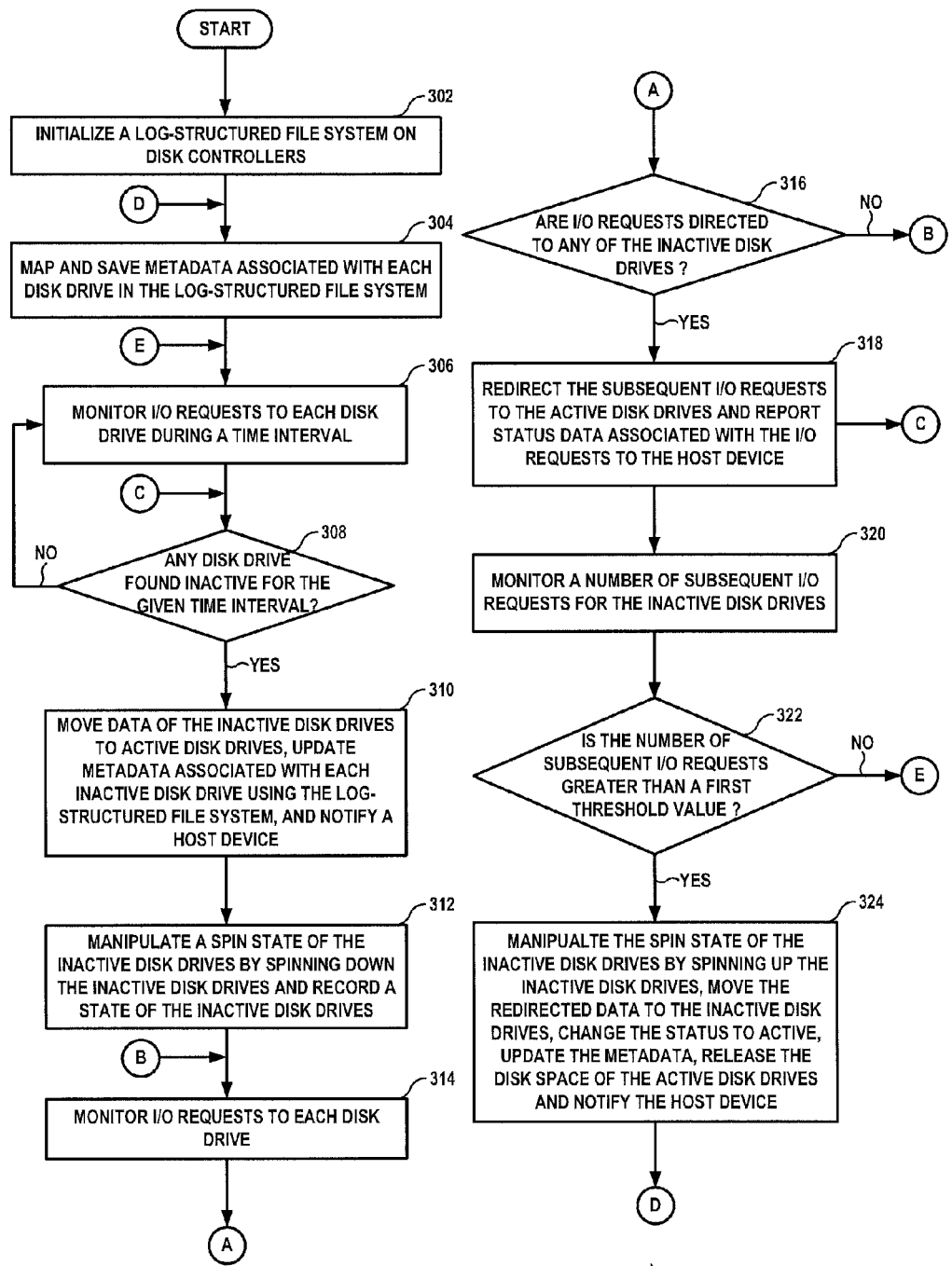
FIG. 3 illustrates a flow chart for manipulating a spin state of each disk drive in a subsystem of a disk array, according to one embodiment.

FIG. 3 illustrates a flow chart 300 for manipulating a spin state of each disk drive in a subsystem of a disk array, according to one embodiment. In step 302, a log-structured file system on disk controllers is initialized. In step 304, metadata associated with each disk drive in the subsystem is mapped and saved in the log-structured file system. In one exemplary implementation, the disk controllers mirror the metadata of the log-structured file system in order to have redundancy. It is appreciated that, the metadata in the log-structured file system is mirrored on the disk controllers using inter-controller dedicated mirror channels. In step 306, I/O requests to each disk drive in the subsystem are monitored during a time interval ($t=0 \geq x$).

In step 308, it is determined whether any disk drive in the subsystem is inactive for the given time interval ($t=x$). In one embodiment, said any disk drive in the subsystem is identified as an inactive disk drive based on a number of I/O requests directed to said any disk drive for the given time interval. In this embodiment, said any disk drives is identified as the inactive disk drive if the number of I/O requests directed to said any disk drive for the given time interval is zero.

If one or more inactive disk drives are identified, then step 310 is performed, else the monitoring of the I/O requests to each disk drive is continued. In step 310, data from the one or more inactive disk drives is moved to one or more active disk drives having a free disk space. Further, in step 310, the metadata associated with each of the inactive disk drives is updated using the log-structured file system and a host device is notified accordingly. In step 312, a spin state of the one or more inactive disk drives is manipulated by spinning down the one or more inactive disk drives. In one embodiment, the one or more inactive disk drives are spun down by running the one or more inactive disk drives in a low power mode. Further, in step 312, a state of the one or more inactive disk drives is recorded in the log-structured file system.

In step 314, I/O requests to each disk drive in the subsystem are monitored. In step 316, it is determined whether the I/O requests are directed to the one or more inactive disk drives. If the I/O requests are directed to the one or more inactive disk drives, then step 318 is performed, else monitoring of the I/O requests to each disk drive is continued. In step 318, the subsequent I/O requests for the one or more inactive disk drives are redirected to the respective one or more active disk drives by accessing the metadata of the log-structured file system. In one embodiment, the subsequent I/O requests include subsequent data which is tagged as redirected data. Further, in step 318, status data associated with the subsequent I/O requests is reported to the host device. For example, the status data associated with the subsequent I/O requests includes I/O request completion information and redirected location information.

In step 320, a number of subsequent I/O requests for the respective one or more inactive disk drives are monitored. In step 322, a check is made to determine whether the number of subsequent I/O requests for the respective one or more inactive disk drives is greater than a first threshold value. If the number of subsequent I/O requests for the respective one or more inactive disk drives is greater than the first threshold value, then step 324 is performed, else the process 300 is routed back to step 306. In step 324, the spin state of the one or more inactive disk drives is manipulated by spinning up the one or more inactive disk drives. Further, in step 324, the redirected data is moved (e.g., copied back) from the one or more active disk drive to the respective one or more inactive disk drives.

Furthermore, in step 324, the state of the one or more inactive disk drives is changed from inactive to active. In addition, in step 324, the free disk space associated with the one or more active disk drives used for storing the data associated with the one or more inactive disk drives is released. Also, in step 324, the metadata of the log-structured file system is updated based on the moving of the redirected data and the changing of the state of the one or more inactive disk drives and then the host device is also notified accordingly. It is appreciated that, the one or more disk drives (which were inactive) continues to service the I/O requests upon performing the step 324. Moreover, the process 300 repeats till the system is up and running.

Figure 4:
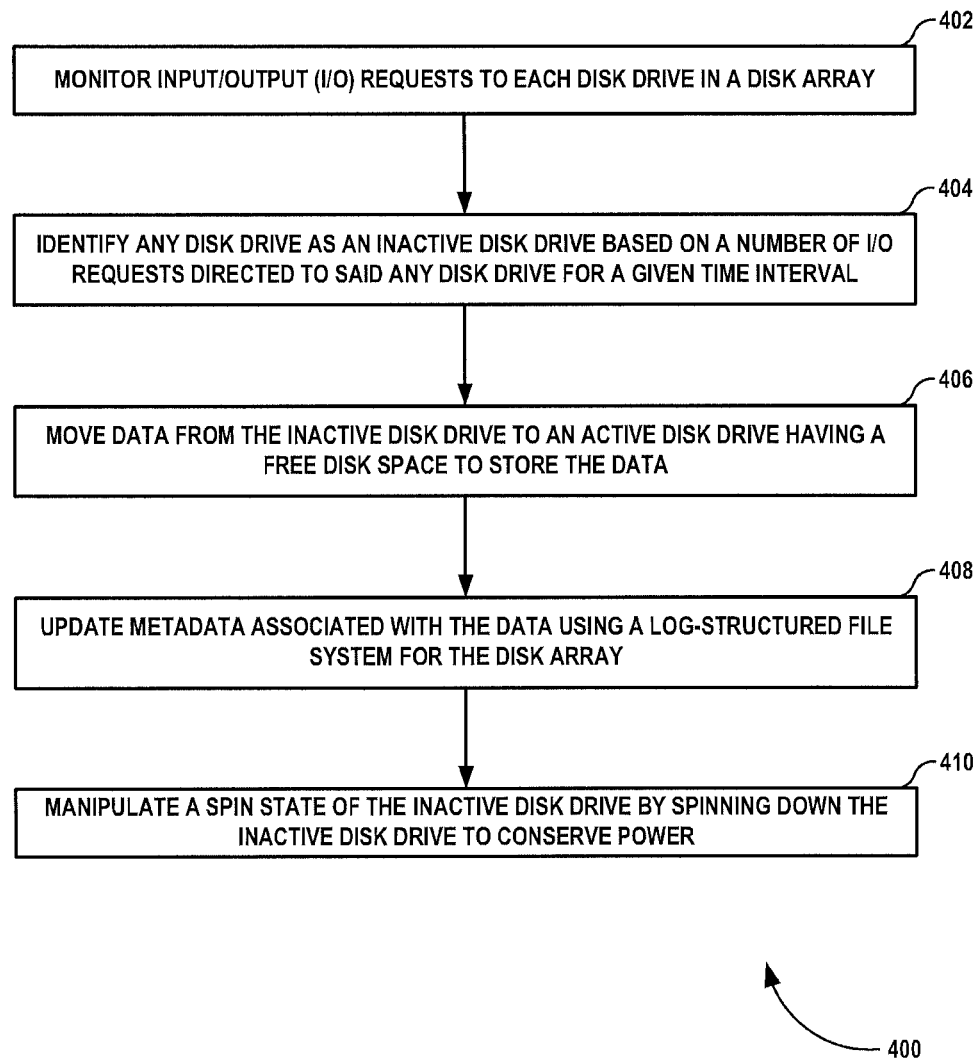
FIG. 4 illustrates a process flow chart of an exemplary method for manipulating a spin state of each disk drive in a disk array, according to one embodiment.

FIG. 4 illustrates a process flow chart 400 of an exemplary method for manipulating a spin state of each disk drive in a disk array (e.g., RAID), according to one embodiment. In operation 402, I/O requests to each disk drive in the disk array are monitored. In operation 404, any disk drive is identified as an inactive disk drive based on a number of I/O requests directed to said any disk drive for a given time interval. In one embodiment, said any disk drive is identified as the inactive disk drive if the number of the I/O requests directed to said any disk drive for the given time interval is zero. In operation 406, data from the inactive disk drive is moved to an active disk drive having a free disk space to store the data.

In operation 408, metadata associated with the data is updated using a log-structured file system for the disk array. For example, the metadata includes an authentication key for the data, an ID of the inactive disk drive, an ID of the active disk drive, a data range of the data in the inactive disk drive, a data range of the data in the active disk drive, an access mode of the data, and a time stamp associated with the data. In operation 410, a spin state of the inactive disk drive is manipulated by spinning down the inactive disk drive. One skilled in the art will appreciate that, the spinning down the inactive disk drive helps conserve power.

In one embodiment, subsequent I/O requests for the inactive disk drive are redirected to the active disk drive by accessing the metadata of the log-structured file system. For example, the subsequent I/O requests include subsequent data which is tagged as redirected data. In another embodiment, the spin state of the inactive disk drive is manipulated by spinning up the inactive disk drive if a number of subsequent I/O requests becomes greater than a first threshold value. In this embodiment, the redirected data from the active disk drive is moved to the inactive disk drive and a state of the inactive disk drive is changed from inactive to active.

Further, the metadata of the log-structured file system is updated based on the moving of the redirected data and the changing of the state of the inactive disk drive. Moreover, in one example embodiment, a computer readable medium for manipulating a spin state of each drive in a RAID system has instructions that, when executed by a computer, cause the computer to perform the method of FIG. 4.

The above-described method ensures significant improvement in power consumption of a disk array by identifying inactive disk drives in the disk array, spinning down the inactive disk drives and redirecting I/O requests for the inactive disk drives to active disk drives having a free disk space. The above-described method provides improved data locality as only active disk drives are accessed during normal I/O operations. Also, the above-described method provides improved drive channel availability as the disk drives in the subsystem which are required to service I/O requests are kept active. Further, the above-described method ensures data consistency as mapped data is kept on persistent store (e.g., log-structured file system). Moreover, the above-described technique restores active disk drive locations in case of power interruption or power cycled to the subsystem based on the metadata of the log-structured file system.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

What is claimed is:

1. A method for conserving power, the method comprising:
monitoring first input/output (I/O) requests for a first disk drive;
determining that the first disk drive is inactive based on a first number of first I/O requests directed to the first disk drive for a given time interval;
monitoring second I/O requests for a second disk drive;
determining that the second disk drive is active based on a second number of second I/O requests directed to the second disk drive for the given time interval;
moving data from the first disk drive to the second disk drive;
updating metadata associated with the moved data to indicate that the moved data may be accessed on the second disk drive; and
spinning down the first disk drive to conserve power.

2. The method of claim 1, wherein the metadata comprises one or more selected from a group consisting of an authentication key for the moved data, an identifier (ID) of the first disk drive, an ID of the second disk drive, a data range of the moved data on the first disk drive, a data range of the moved data on the second disk drive, an access mode of the moved data, and a time stamp associated with the moved data.

3. The method of claim 1, wherein the first disk drive and the second disk drive are included in a redundant array of independent disks (RAID).

4. The method of claim 1, further comprising determining whether the second disk drive has disk space to store the moved data before moving the moved data.

5. The method of claim 1, further comprising redirecting third I/O requests for the first disk drive to the second disk drive based on the metadata.

6. The method of claim 1, further comprising spinning up the first disk drive when a number of third I/O requests for the first disk drive becomes greater than a threshold value.

7. The method of claim 6, further comprising:
moving the moved data from the second disk drive back to the first disk drive;
changing a disk drive state of the first disk drive from inactive to active; and
updating the metadata associated with the moved data to indicate that the moved data may be accessed on the first disk drive.

8. A non-transitory machine-readable medium comprising a first plurality of machine-readable instructions which when executed by one or more processors associated with a disk controller are adapted to cause the one or more processors to perform a method comprising:
monitoring a first number of first input/output (I/O) requests directed to a first disk drive during a given time interval;
determining that the first disk drive is inactive based on the first number of the first I/O requests;
monitoring a second number of second I/O requests directed to a second disk drive during the given time interval;
determining that the second disk drive is active based on the second number of the second I/O requests;
moving data from the first disk drive to the second disk drive;
updating volume mapping information associated with the moved data to indicate that the moved data may be accessed on the second disk drive; and
conserving power by spinning down the first disk drive.

9. The non-transitory machine-readable medium of claim 8, further comprising a second plurality of machine-readable instructions which when executed by the one or more processors associated with the disk controller are adapted to cause the one or more processors to perform a method comprising redirecting third I/O requests for the first disk drive to the second disk drive based on the volume mapping information.

10. A disk controller comprising:
a processor;
a first memory for storing metadata associated with a first disk drive and a second disk drive coupled to the disk controller; and
a second memory having to set of instructions that when executed by the processor cause the processor to:
monitor first input/output (I/O) requests for a first disk drive;
determine that the first disk drive is inactive based on a first number of first I/O requests directed to the first disk drive for a given time interval;
monitor second I/O requests for a second disk drive;
determine that the second disk drive is active based on a second number of second I/O requests directed to the second disk drive for the given time interval;
copy data from the first disk drive to the second disk drive;
update metadata associated with the data to indicate that the data may be accessed on the second disk drive; and
spin down the first disk drive to conserve power.

11. The disk controller of claim 10, wherein the set of instructions when executed by the processor farther cause the processor to determine whether the second disk drive has disk space to store the data before moving the data.

12. The disk controller of claim 10, wherein the first disk drive and the second disk drive are included in a redundant array of independent disks (RAID).

13. The disk controller of claim 10, wherein the first memory comprises a nonvolatile flash memory.

14. The disk controller of claim 10, wherein the first memory is coupled to the processor using an integrated drive electronics (IDE) interlace.

15. The disk controller of claim 10, wherein third I/O requests directed to the first disk drive are redirected to the second disk drive based on the metadata.

16. The disk controller of claim 10, wherein the metadata comprises volume mapping information comprising one or more selected from a group consisting of an authentication key for the copied data, an identifier (ID) of the first disk drive, an ID of the second disk drive, a data range of the copied data on the first disk drive, a data range of the copied data on the second disk drive, an access mode of the copied data, and a time stamp associated with the copied data.

17. The disk controller of claim 16, wherein each of the ID of the inactive disk drive and the ID of the active disk drive is based on a port/target/logical unit number (LUN).

18. The disk controller of claim 10, wherein the set of instructions when executed by the processor further cause the processor to spin up the first disk drive when a number of the third I/O requests for the first disk drive becomes greater than a threshold value.

19. The disk controller of claim 18, wherein the set of instructions when executed by the processor further cause the processor to:
copy the data from the second disk drive back to the first disk drive; and
update the metadata associated with the data to indicate that the data may be accessed on the first disk drive.

20. The disk controller of claim 19, wherein a disk drive state of the first disk drive is changed from inactive to active.

* * * * *